United States Patent
Conilogue

Patent Number: 5,309,384
Date of Patent: May 3, 1994

[54] DIGITAL MULTIPLIER WITH CARRY-SUM INPUT

[75] Inventor: Randall L. Conilogue, Thousand Oaks, Calif.

[73] Assignee: Hughes Aircraft Company, Los Angeles, Calif.

[21] Appl. No.: 981,634

[22] Filed: Nov. 25, 1992

[51] Int. Cl.[5] ............................................. G06F 7/52
[52] U.S. Cl. ......................................................... 364/757
[58] Field of Search ............... 364/757, 754, 759, 760, 364/736

[56] References Cited

U.S. PATENT DOCUMENTS

| | | | |
|---|---|---|---|
| 4,752,905 | 6/1988 | Nakagawa et al. | 364/757 X |
| 4,839,848 | 6/1989 | Peterson et al. | 364/757 |
| 4,868,778 | 9/1989 | Disbrow | 364/757 |

OTHER PUBLICATIONS

Digital Computer Arithmetic Design and Implementation, Cavanaugh, McGraw-Hill, 1984, Chapter Three, "Fixed-Point Multiplication," pp. 137–213.

Primary Examiner—Tan V. Mai
Attorney, Agent, or Firm—L. A. Alkov; W. K. Denson-Low

[57] ABSTRACT

A digital multiplier that includes a combinatorial ripple carry adder for adding the sum and carry components of a first operand represented in sum and carry form to produce a converted first operand represented in standard binary form, and a combinatorial array multiplier for multiplying a second operand represented in standard binary form with the converted first operand to produce a product represented in sum and carry form.

6 Claims, 3 Drawing Sheets

DIGITAL MULTIPLIER WITH CARRY-SUM INPUT

BACKGROUND OF THE INVENTION

The subject invention is directed generally to digital multiplier arrays, and more particularly to a digital multiplier array having an input for receiving an operand in carry-sum form.

In the text book DIGITAL COMPUTER ARITHMETIC Design and Implementation, Cavanaugh, McGraw-Hill, 1984, multiplication is defined as the repeated addition of the multiplicand, where the number of times it is added is defined by the multiplier. Each step generates a partial product and the result of the final addition is the product. This is analogous to what is done in long hand multiplication as a series of shift-add operations.

Digital multiplier architectures have generally been directed to avoiding the repeated addition procedure and the shift-add procedure, both of which are time consuming and inefficient. Known digital multiplier architectures have included array multipliers wherein the multiplicand and the multiplier are given by standard binary vectors, and the product is encoded in a carry and sum word pair. The encoded product representation can be converted into standard binary representations by arithmetically adding the carry and sum words, for example for use by another array multiplier.

A consideration with known array multipliers is the processing time required to convert multiplication products from carry and sum representation to binary representation.

SUMMARY OF THE INVENTION

It would therefore be an advantage to provide an array multiplier that receives one operand in carry and sum representation.

The foregoing and other advantages are provided by the invention in a digital multiplier that includes a combinatorial ripple carry adder for adding the carry and sum components of a first operand represented in carry and sum form to produce a converted first operand represented in standard binary form, and a combinatorial array multiplier for multiplying a second operand represented in standard binary form with the converted first operand to produce a product represented in carry and sum form. The propagation of carries through the ripple carry adder occur concurrently with the propagation of data through the array multiplier, which provides for reduced processing time in comparison to a conventional multiplier array that generates a product in carry and sum form and then converts the carry and sum representation to standard binary form.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
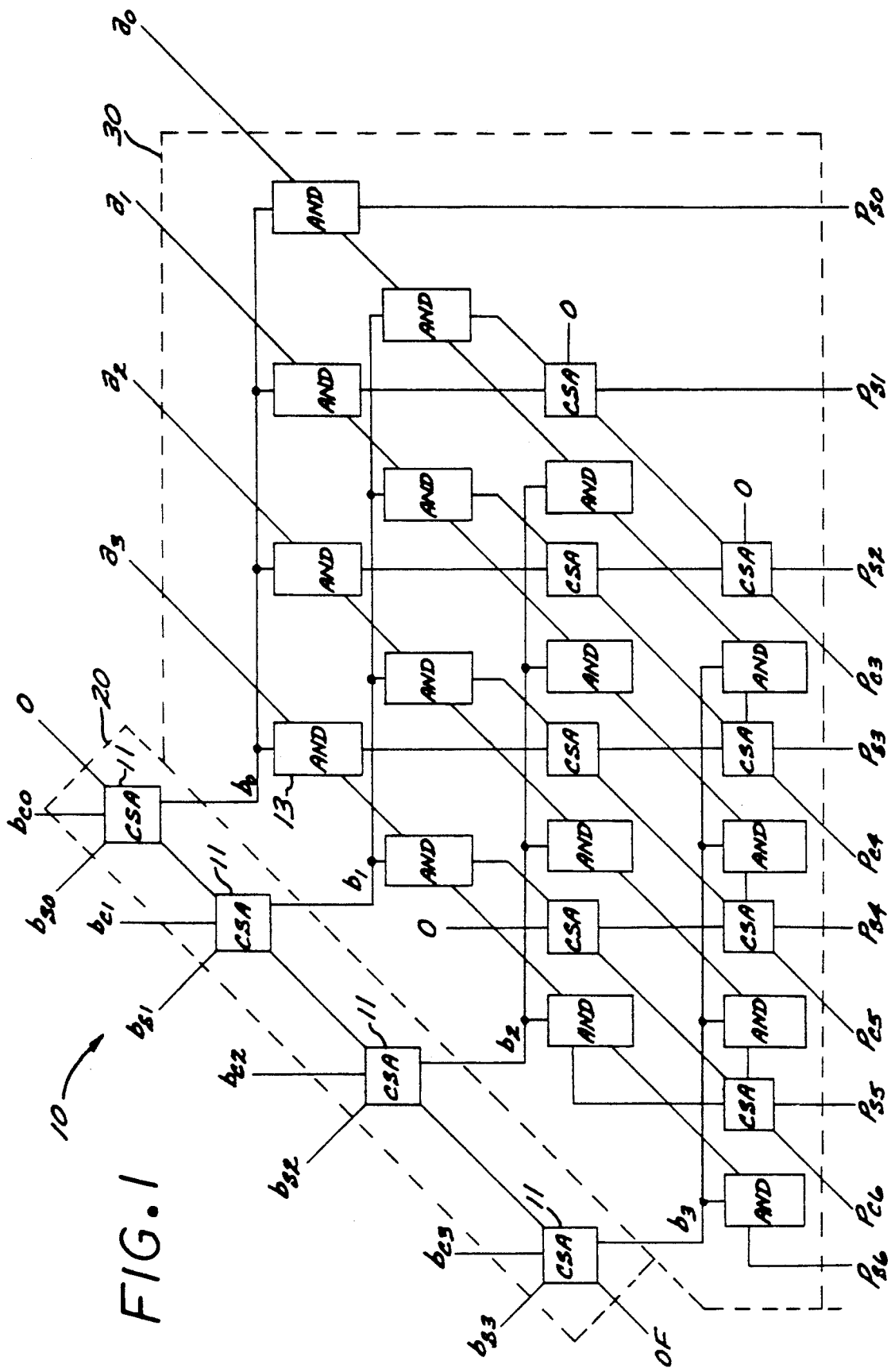
FIG. 1 is a schematic diagram of an array multiplier in accordance with the invention.

In the following detailed description and in the several figures of the drawing, like elements are identified with like reference numerals.

Referring now to FIG. 1, set forth therein by way of illustrative example is a block diagram of a 4×4 multiplier structure 10 in accordance with the invention for multiplying two 4-bit operands wherein the 4-bit multiplier is encoded in a conventionally known carry and sum word pair that includes a 4-bit carry word ($b_{c3}$ $b_{c2}$ $b_{c1}$ $b_{c0}$) and a 4-bit sum word ($b_{s3}$ $b_{s2}$ $b_{s1}$ $b_{s0}$), wherein the numerals in the subscripts of the bit identifiers indicate order of significance with the 0th bit being the least significant. The 4-bit multiplicand is a 4-bit word ($a_3$ $a_2$ $a_1$ $a_0$).

The bits of the carry and sum word pair input for the multiplier are provided as inputs to a combinatorial ripple carry adder 20 that includes respective carry save adders (CSA's) 11 for correspondingly weighted bits of the carry word ($b_{c3}$ $b_{c2}$ $b_{c1}$ $b_{c0}$) and the sum word ($b_{s3}$ $b_{s2}$ $b_{s1}$ $b_{s0}$) As is well known, a standard binary number represented in carry and sum form can be converted to standard binary representation by arithmetic addition of the carry word and the sum word, while discarding the overflow bit OF.

Figure 2:
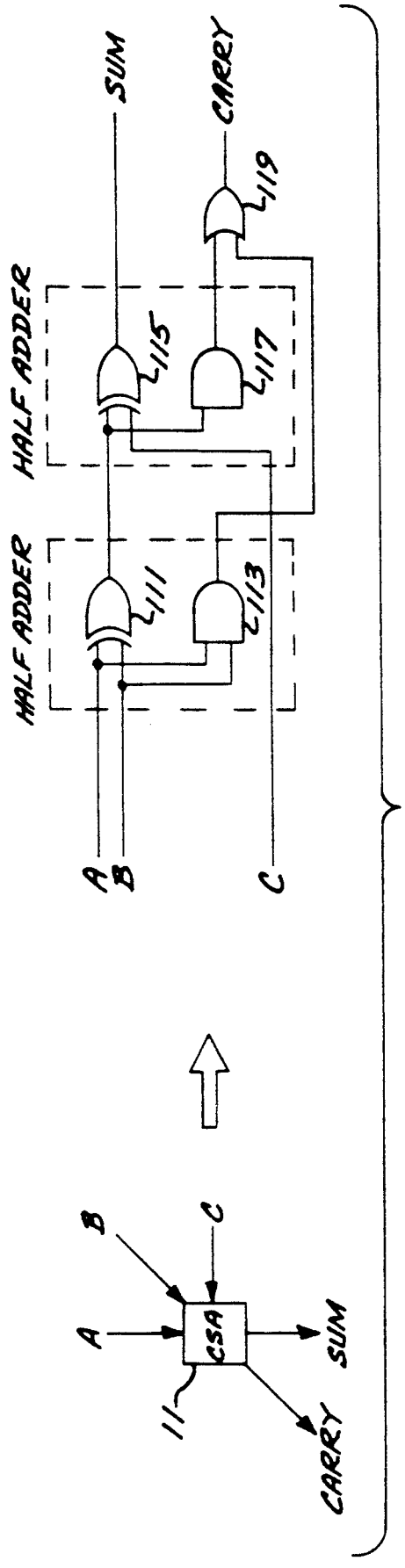
FIG. 2 is a schematic diagram illustrating the specific circuit of each of the carry save adders (CSA's) in the array multiplier of FIG. 1 and the connections of the CSA's.

FIG. 2 depicts the signal connections and a specific circuit for each of the CSA's 11. Each CSA 11 includes A, B, and C inputs, and provides a Carry output and a Sum output. The A and B inputs are provided as inputs to an exclusive OR gate 111 and an AND gate 113 that form a first half-adder. The output of the exclusive OR gate 111 and the C input to the CSA are provided as inputs to an exclusive OR gate 115 and an AND gate 117 that form a second half-adder. The output of the exclusive OR gate 115 of the second half-adder provides the Sum output of the CSA, while the Carry output is provided by an OR gate 119 whose inputs are provided by the outputs of the AND gate 113 and the AND gate 117. The Sum output bit represents the sum of the addition of the A, B, and C inputs, while the Carry output bit represents the carry of the addition of the A, B, and C inputs.

Each CSA of the ripple carry adder 20 receives correspondingly weighted or positioned carry and sum bits on its A and B inputs, and receives the carry from the next less significant CSA 11 on its C input. The C input to the least significant CSA 11, whose A and B inputs are provided by the bits $b_{c0}$ and $b_{s0}$, is hardwired to 0. The Sum outputs of the CSA's 11 of the ripple carry adder 20 form a 4-bit word ($b_3$ $b_2$ $b_1$ $b_0$). The Carry output of the CSA 11 for the highest order sum bit $b_{s3}$ and carry bit $b_{c3}$ comprises the overflow bit OF which is discarded.

The 4-bit word output of the ripple carry adder 20 and the multiplicand A are provided as inputs to a conventional 4×4 combinatorial multiplier array 30 that multiplies two 4-bit operands represented in standard binary form to produce a product represented in carry and sum form. The multiplier array 30 generally duplicates the paper-and pencil method of multiplication wherein each bit of the multiplicand is multiplied by each of the multiplier bits to form respective partial products that are shifted to the left with increasing weight of the multiplier bit:

```
                           a3    a2    a1    a0       X)
                           b3    b2    b1    b0
                          ─────────────────────
                          a3b0  a2b0  a1b0  a0b0
                    a3b1  a2b1  a1b1  a0b1
              a3b2  a2b2  a1b2  a0b2
        a3b3  a2b3  a1b3  a0b3
``` wherein $a_i b_j$ represents the one-bit product or logical AND of the multiplicand bit $a_i$ and the multiplier bit $b_j$.

Figure 3:
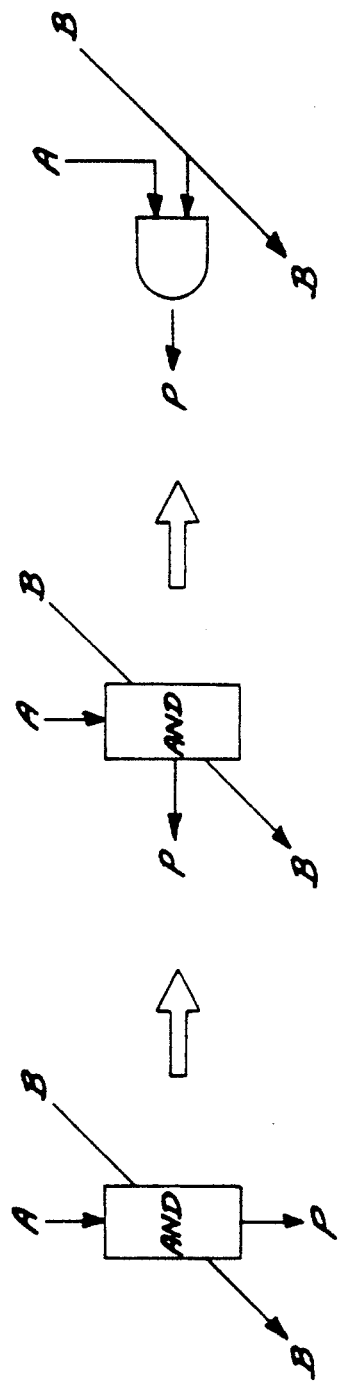
FIG. 3 is schematic diagram illustrating the connections to each of the AND gates in the array multiplier of FIG. 1.

The multiplier array includes sixteen AND gates 13 for performing the respective $1 \times 1$ multiplications for each of the bits of each of the partial products. FIG. 3 depicts the signal connections for each of the AND gates in the block diagram of FIG. 1. In particular, each diagonal line indicates that the multiplicand bit identified at the top of such diagonal line in FIG. 1 is provided to the A input of each of the AND gates 13 along the line. The bits of the multiplier are provided to the B inputs of the AND gates as specifically shown by the individual connections at the top of the AND gates in FIG. 1, while the outputs P of the AND gates are at the bottom or left side of each of the AND gates in FIG. 1. The multiplier array further includes CSA's 11 that are appropriately located in accordance with the required shifts between partial products for performing the additions of the columns of the partial products to provide the bits $p_{c6}\ p_{c5}\ p_{c4}\ p_{c3}$ of a product carry word ($p_{c6}\ p_{c5}\ p_{c4}\ p_{c3}\ p_{c2}\ p_{c1}\ p_{c0}$) wherein the bits $p_{c2}\ p_{c1}\ p_{c0}$ are all 0s, and a product sum word ($p_{s6}\ p_{s5}\ p_{s4}\ p_{s3}\ p_{s2}\ p_{s1}\ p_{s0}$).

Essentially, the multiplier array includes an AND gate to generate each of the partial products and CSA's to add the partial products and carries from any preceding column of partial products. As compared to array multipliers that produce a product in standard binary form, the multiplier array 30 does not include a final row of CSA's.

A more detailed discussion of multiplier arrays can be found in DIGITAL COMPUTER ARITHMETIC Design and Implementation, Cavanaugh, McGraw-Hill, Inc., 1984, pages 183-213, incorporated herein by reference.

While the foregoing has been a specific example of a $4 \times 4$ array multiplier in accordance with the invention, it should be appreciated that the invention can be implemented in NxN multipliers wherein N is greater than or equal to 4.

Figure 4:
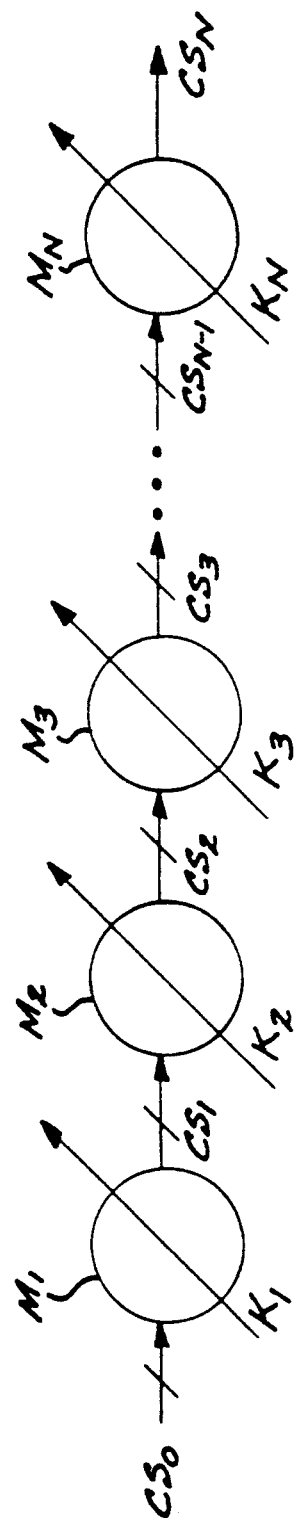
FIG. 4 is a schematic diagram of a cascaded multiplier in accordance with the invention that utilizes array multipliers as illustrated by the array multiplier FIG. 1

Referring now to FIG. 4, set forth therein is a cascaded multiplier which is advantageously implemented with multipliers of the architecture shown in FIG. 1. In particular, the cascaded multiplier includes a sequence of multipliers $M_1$ through $MN$, each receiving respective multiplicand inputs $K_1$ through $KN$ which are in standard binary representation. The multiplier $M_1$ receives a multiplier input $C_{S0}$ in carry and sum form and provides a product output $CS_1$ which is in carry and sum form. The multiplier inputs for the remaining multipliers $A_2$ through $AN$ are respectively the carry and sum product outputs $CS_1$ through $CS_{N-1}$ of the prior in sequence multipliers $A_1$ through $A_{N-1}$. Depending upon application, the multipliers can increase in size as required to accommodate multiplier inputs from a preceding multiplier, or they can be of the same size in which case the low order bits of the multiplier products are truncated.

A cascaded multiplier utilizing multipliers of the architecture of FIG. 1 provides for increased processing throughput for the following reasons. The multipliers avoid the processing time utilized in conventional multiplier arrays for resolving a carry and sum representation of the resulting product to standard binary representation. The invention adds propagation delay with the ripple carry adder at the input to each multiplier, but the additional propagation delay is fixed at 2 gate delays produced by simple combinatorial gates and is independent of multiplier size since the combinatorial propagation of carries in the ripple carry adder 20 occurs concurrently with the combinatorial propagation of data through the multiplier array 30. For applications that require many cascaded multipliers, use of multipliers in accordance with the invention would result in processing time reduction that is significant.

Although the foregoing has been a description and illustration of specific embodiments of the invention, various modifications and changes thereto can be made by persons skilled in the art without departing from the scope and spirit of the invention as defined by the following claims.

What is claimed is:

1. A digital multiplier having inputs for a first operand represented in sum and carry form and a second operand represented in standard binary form, comprising:

combinatorial ripple carry adding means for adding the sum and carry components of the first operand to produce a converted first operand represented in standard binary form; and a combinatorial array multiplier for, multiplying the second operand with said converted first operand to produce a product represented in sum and carry form;

whereby combinatorial propagation of carries in said ripple carry adding means occurs concurrently with the combinatorial propagation of data through the multiplier array.

2. The array multiplier of claim 1 wherein said ripple carry adding means includes a plurality of carry save adders.

3. A cascaded multiplier comprising:

a first digital multiplier having inputs for a first operand represented in sum and carry form and a second operand represented in standard binary form, and producing a first product represented in sum and carry form; and a second digital multiplier having inputs for a first operand represented in sum and carry form and second operand represented in standard binary form, and producing a second product represented in sum and carry form, wherein the first operand input to said second digital multiplier comprises said first product represented in sum and carry form.

4. The cascaded multiplier of claim 3 wherein each of said digital multipliers comprises:

combinatorial ripple carry adding means for adding the sum and carry components of the first operand to produce a converted first operand represented in standard binary form; and a combinatorial array multiplier for multiplying the second operand with said converted first operand to produce a third product represented in sum and carry form;

whereby combinatorial propagation of carries in said ripple carry adding means occurs concurrently with the combinatorial propagation of data through the multiplier array.

5. A digital multiplier having inputs for a first operand represented in standard binary form and a second operand represented in standard binary form, comprising:

means for converting the first operand represented in standard binary form to sum and carry form with sum and carry components;

combinatorial ripple carry adding means for adding the sum and carry components of the first operand to produce a converted first operand represented in standard binary form; and a combinatorial array multiplier for multiplying the second operand with said converted first operand to produce a product represented in sum and carry form;

whereby combinatorial propagation of carries in said ripple carry adding mean occurs concurrently with the combinatorial propagation of data through the multiplier array.

6. A cascaded multiplier comprising:

means for converting a first operand in standard binary form to sum and carry form;

a first digital multiplier having inputs for the first operand represented in sum and carry form and a second operand represented in standard binary form, and producing a first product represented in sum and carry form; and a second digital multiplier having inputs for the first operand represented in sum and carry form and second operand represented in standard binary form, and producing a second product represented in sum and carry form, wherein the first operand input to said second digital multiplier comprises said first product represented in sum and carry form.

* * * * *